J. GAULT.
Projectile.
No. 35,734.
Patented June 24, 1862.
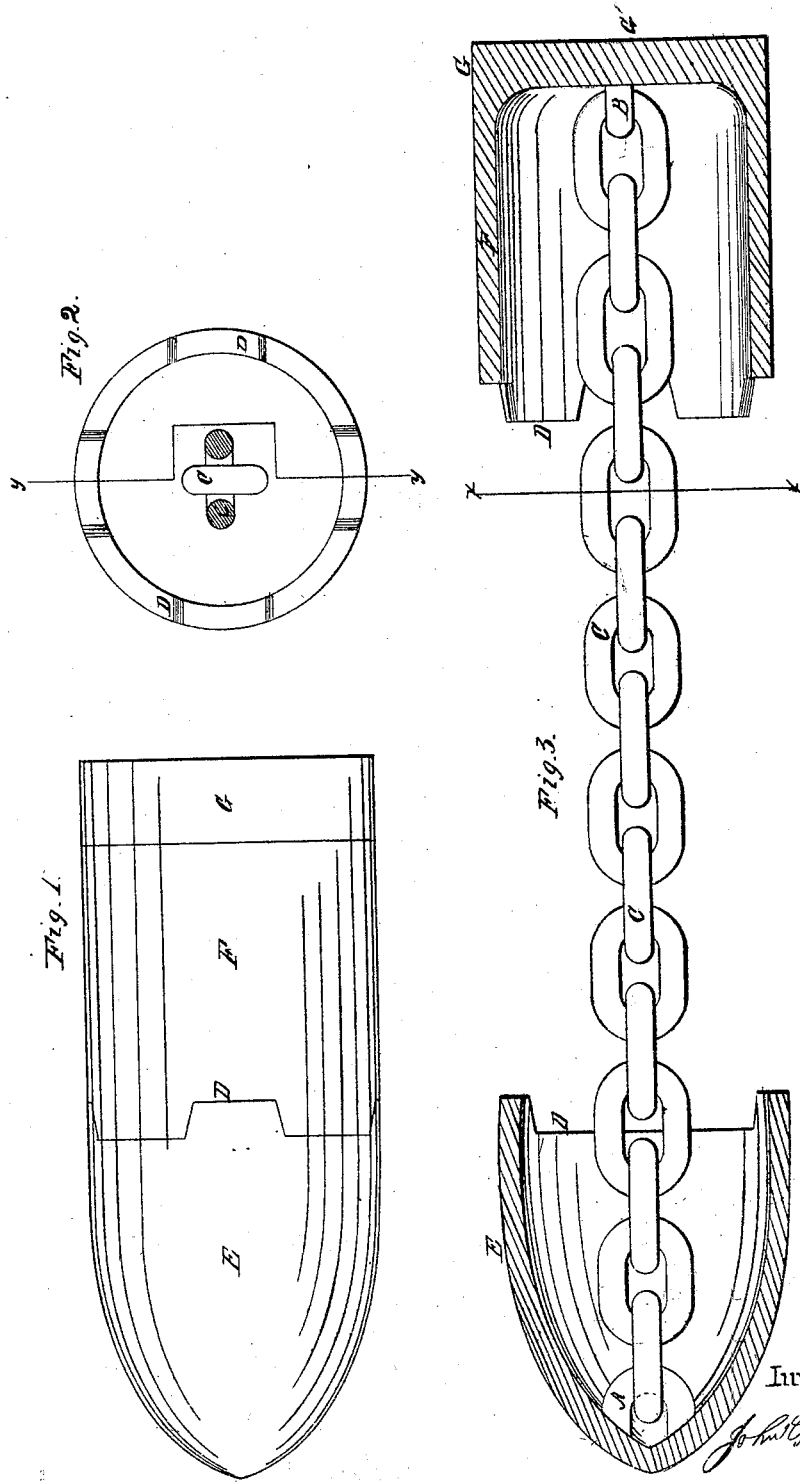
Witnesses
Inventor

UNITED STATES PATENT OFFICE.

JOHN GAULT, OF BOSTON, MASSACHUSETTS, ASSIGNOR TO HIMSELF AND
W. V. BARKALOW, OF NEW YORK, N. Y.

IMPROVEMENT IN CHAIN-SHOT.

Specification forming part of Letters Patent No. 35,734, dated June 24, 1862.

*To all whom it may concern:*

Be it known that I, JOHN GAULT, of Boston, in the county of Suffolk and State of Massachusetts, have invented an Improvement in Chain-Shot, of which the following is a specification.

My invention consists in constructing an elongated ball divided transversely at or near its center and connecting the two half-balls by a chain, and then uniting the said halves in such a manner that they will keep together during their flight, but when meeting any resistance will at once separate and render the chain effective—a result that is not obtained with certainty by any chain-shot now known, nor can it be when such effect depends upon the use of a fuse, and being a decided advantage over a round shot kept together by means of grooved edges used for similar purposes.

In the accompanying drawings, Figure 1 is a perspective view. Fig. 2 shows a vertical section of the chain. Fig. 3 shows the section of the ball and connection with the chain, which may be of any required length.

To enable others skilled in the art to make and use my invention, I will proceed to describe its construction and operation.

I make my ball of iron or other metal commonly used, and of any size desired, the shell of which may be of any thickness deemed proper, being of the same thickness on each half of the ball, as shown at E and F, in order to form a perfect joint and a smooth surface. The back part of the ball is much thicker than its sides, not only for the purposes of safety in its discharge, but by giving it greater weight at that point it is more liable to keep together during its flight, and will therefore have a longer range. To the thick part of the ball I add a brass ring or any soft metal, and in its center I place the staple B, which is cast with the ball into the thick part G', previously passing the staple through one of the links C at one end of the chain, the other end being fastened in a similar manner, as shown at A. I then coil the chain as closely as possible in each half of the ball, and then, bringing the two halves together, I inclose the chain perfectly within the ball, which is kept together by means of the several dovetails D D D until it meets some resistance which produces the least lateral motion of the same and divides the ball, rendering the chain effective.

What I claim as my invention, and desire to secure by Letters Patent, is—

An elongated chain-shot divided transversely when the two portions are united by dovetails or their equivalents, substantially as described.

JOHN GAULT.

Witnesses:
JOHN S. HOLLINGSHEAD,
F. F. KIRBY.